(12) United States Patent
Lin

(10) Patent No.: US 8,730,379 B2
(45) Date of Patent: May 20, 2014

(54) QUICK AUTO-FOCUS METHOD

(71) Applicant: Kuo-Hung Lin, New Taipei (TW)

(72) Inventor: Kuo-Hung Lin, New Taipei (TW)

(73) Assignee: Hon Hai Precison Industry Co., Ltd., New Taipei (TW)

( * ) Notice: Subject to any disclaimer, the term of this patent is extended or adjusted under 35 U.S.C. 154(b) by 0 days.

(21) Appl. No.: 13/656,831

(22) Filed: Oct. 22, 2012

(65) Prior Publication Data

US 2013/0321693 A1 Dec. 5, 2013

(30) Foreign Application Priority Data

Jun. 5, 2012 (TW) .............................. 101120036 A

(51) Int. Cl.
*H04N 5/232* (2006.01)
(52) U.S. Cl.
USPC .......................................... 348/349; 348/356
(58) Field of Classification Search
USPC .................. 348/345, 348, 349, 356
See application file for complete search history.

(56) References Cited

U.S. PATENT DOCUMENTS

| 6,356,296 B1* | 3/2002 | Driscoll et al. ................. 348/36 |
| 7,330,212 B2* | 2/2008 | Tomita .......................... 348/345 |
| 8,451,338 B2* | 5/2013 | Levin et al. ................. 348/208.4 |
| 2001/0050718 A1* | 12/2001 | Ito .................................. 348/345 |
| 2005/0007486 A1* | 1/2005 | Fujii et al. ..................... 348/345 |

* cited by examiner

*Primary Examiner* — Aung S Moe
*Assistant Examiner* — Amy Hsu
(74) *Attorney, Agent, or Firm* — Novak Druce Connolly Bove + Quigg LLP

(57) ABSTRACT

An auto-focus method controls a motor to drive an optical lens of a lens module to a focus point and includes steps of: describing a first parabola according to three coordinate points in a coordinate system; describing a second parabola according to a first highest point of the first parabola and two coordinate points selected from the three coordinate points in the coordinate system, wherein the resolution values of two selected coordinate points are greater than that of unselected coordinate point; comparing a difference between the electric current value of a second highest point of the second parabola and the electric current value of the first highest point with a preset value; wherein when the difference is less than the preset value, the second highest point is regarded as the focus point.

6 Claims, 3 Drawing Sheets

QUICK AUTO-FOCUS METHOD

BACKGROUND

1. Technical Field

The present disclosure relates to auto-focus technologies and, particularly, to an auto-focus method capable of quickly finding a focus position.

2. Description of Related Art

Auto-focus methods are used in a camera to find a focus position. Global search is one of the auto-focus methods, and searching for the focus position in the entire focus range with the smallest motor steps moving forward. A lens of the camera can be accurately driven to the focus position after the searching. However, this method takes a long time to find the focus position and is inefficient.

Therefore, it is desirable to provide an auto-focus method, which can overcome the limitations described.

DETAILED DESCRIPTION

Embodiments of the disclosure will be described with reference to the drawings.

Figure 1:
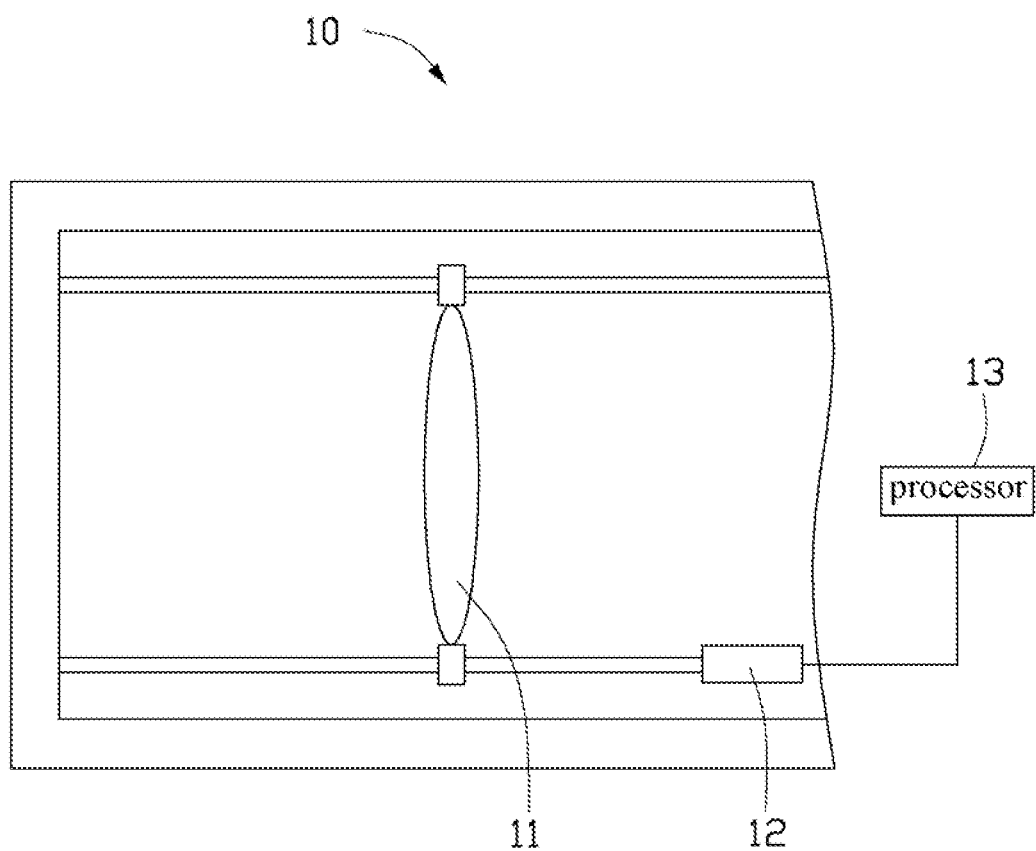
FIG. 1 is a cross-sectional schematic view of a lens module in accordance with an exemplary embodiment.
Figure 2:
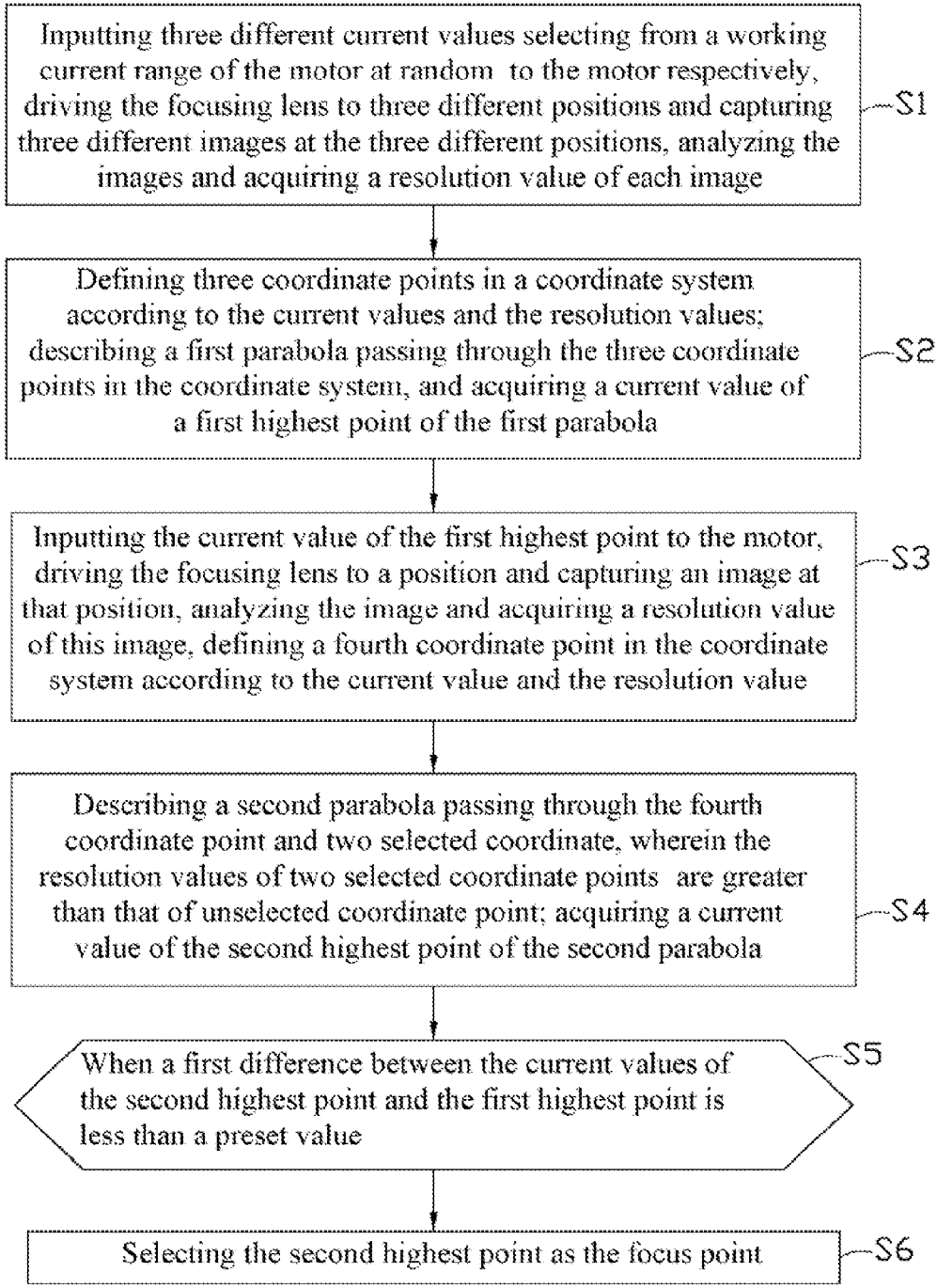
FIG. 2 is a flow chart of an auto-focus method in accordance with an exemplary embodiment.
Figure 3:
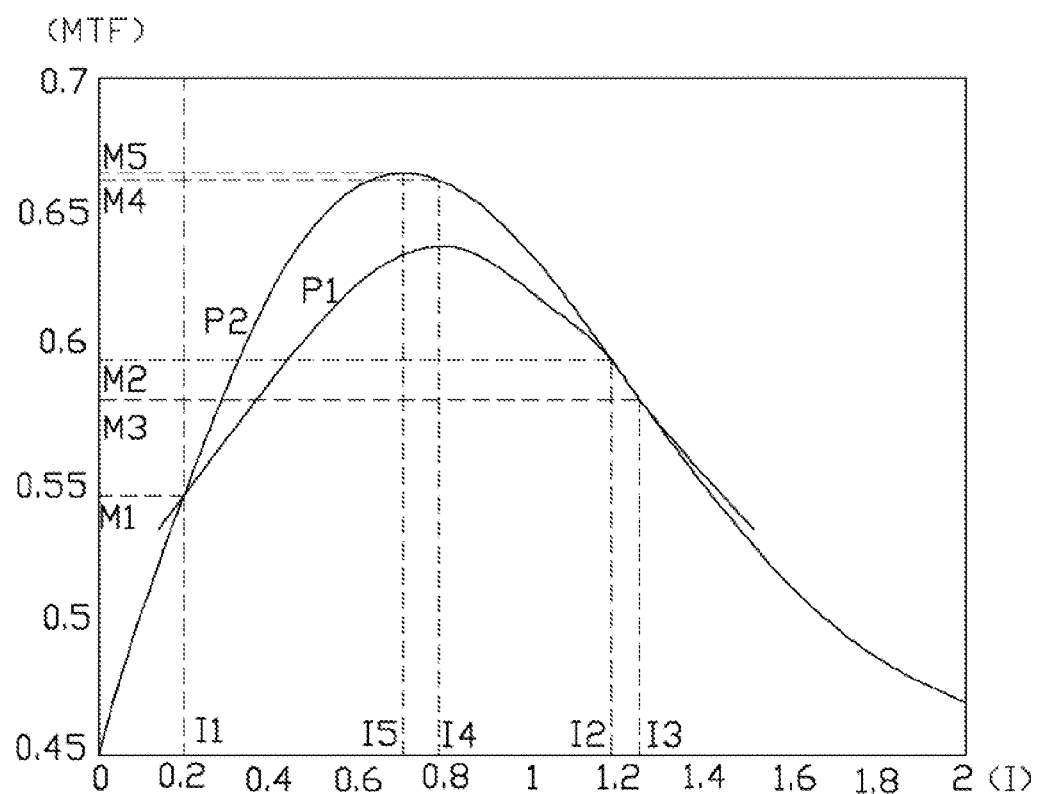
FIG. 3 is a coordinate graph of a resolution value and a current value of the auto-focus method of FIG. 2.

Referring to FIGS. 1-3, an auto-focus method, according to an exemplary embodiment, is used in a camera including a lens module 10. A focusing lens 11 of the lens module 10 is driven by a motor 12 to move within a focus range of the lens module 10. The motor 12 has a working electric current range corresponding to the focus range of the lens module 10. The motor 12 drives the focusing lens 11 to different positions within the focus range according to different values of the electric current applied to the motor 12. The auto-focus method includes steps S1-S7.

In step S1: three different current values are selected from the working electric current range at random and are applied one after the other to the motor 12, the focusing lens 11 is driven to three different positions, and the lens module 10 captures three different images at the three different positions. The images are analyzed and a resolution value of each image is acquired.

In this embodiment, the working electric current range is from about 0 A to about 2 A. The lens module 10 includes a processor 13 for selecting a first current value I1, a second current value I2, and a third current value I3 from the working electric current range and controlling a power source to input the first current value I1, the second current value I2, and the third current value I3 into the motor 12, one after the other. The focusing lens 11 is thus driven to a first position, a second position, and a third position. The processor 13 analyses the three images captured by the lens module 10 at the three different positions and respectively acquires a first resolution value M1, a second resolution value M2, and a third resolution value M3 of the images.

The resolution value of each image is calculated by the following formulas:

$$MTF = (H-L)/(H+L); \quad (1)$$

$$H = Ave + 0.6(Max - Ave); \quad (2)$$

$$L = Ave - 0.6(Ave - Min); \quad (3)$$

wherein Ave is an average value of gray values of all pixels of the image, Max is a maximum value of gray values of all pixels of the image, and Min is a minimum value of gray values of all pixels of the image.

In step S2: a coordinate system is built, wherein the value of the electric current (current value) serves as the abscissa and the resolution value serves as the ordinate; a first coordinate point, a second coordinate point, and a third coordinate point are defined in the coordinate system according to the current values and the corresponding resolution values; a first parabola P1 passing through the three coordinate points is described in the coordinate system, and a current value of a first highest point of the first parabola P1 is acquired.

In this embodiment, the first coordinate point is (I1, M1), the second coordinate point is (I2, M2), and the third coordinate point is (I3, M3). The first parabola P1: $a_1 x^2 + b_1 y + c_1 = 0$ is defined by the coordinate points (I1, M1), (I2, M2), and (I3, M3). The current value of the first highest point of the first parabola P1 is a fourth current value I4.

In step S3: the current value of the first highest point is input to the motor 12, the focusing lens 11 is driven to a corresponding position and the lens module 10 captures an image at that position, the image is analyzed and a resolution value of this image is acquired, a fourth coordinate point is then defined in the coordinate system according to the current value and the resolution value.

In this embodiment, the fourth current value I4 of the first highest point is input to the motor 12, and the focus lens 11 is driven to a corresponding fourth position by the motor 12. The processor 13 analyses the image captured by the lens module 10 at the fourth position and acquires a fourth resolution value M4. A fourth coordinate point is (I4, M4).

In step S4: a second parabola P2 passing through the fourth coordinate point and two coordinate points selected from the first coordinate point, the second coordinate point, and the third coordinate point are imposed on the coordinate system, the resolution values of two selected coordinate points is greater than that of unselected coordinate point; a current value of the second highest point of the second parabola is thus acquired.

In this embodiment, the second resolution value M2 is greater than the first resolution value M1, and the third resolution value M3 is greater than the second resolution value M2. The second parabola P2 passes through the second coordinate point, the third coordinate point, and the fourth coordinate point. The current value of the second highest point of the second parabola P2 is a fifth current value I5.

In step S5: a first difference between the current value of the second highest point and the current value of the first highest point is compared with a preset value. In this embodiment, the first difference D1=I5−I4, and the preset value is about 0.005. The processor 13 compares the first difference with the preset value.

If the first difference is less than the preset value, then the second highest point is determined as being the focus point, and the current value of the second highest point is input to the motor 12, and the focus lens 11 is driven to that focus point. In this embodiment, the fifth current value I5 is input to the motor 12.

If the first difference is greater than the preset value, the current value of the second highest point is input to the motor 12 and a fifth coordinate point is defined in the coordinate system. A third parabola passing through the fifth coordinate point, the fourth coordinate point, and one coordinate point selected from the first coordinate point, the second coordinate point, and the third coordinate point, the resolution value of the selected coordinate point is greater than that of two unselected coordinate points. A current value of the third highest point of the third parabola is thus acquired. At last, a second difference between the current value of the third highest point and the current value of the second highest point is compared with the preset value. The third highest point is regarded as the focus point upon a condition that the second difference is less than the preset value.

In this embodiment, the fifth current value I5 is input to the motor 12, and the focus lens 11 is driven to a corresponding fifth position by the motor 12. The processor 13 analyses the image captured by the lens module 10 at the fifth position and acquires a fifth resolution value M5. A fifth coordinate point is (I5 M5). The third parabola passes through the third coordinate point, the fourth coordinate point, and the fifth coordinate point.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An auto-focus method configured for controlling a motor to driving an optical lens of a lens module to a focus point, comprising:
   selecting three different current values from a working electric current range of the motor at random;
   inputting the three different current values to the motor one after the other, driving the focusing lens to three different positions and capturing three different images at the three different positions;
   analyzing the images and acquiring a resolution value of each image;
   building a coordinate system, wherein the current value serves as abscissa and the resolution value serves as ordinate;
   defining three coordinate points in the coordinate system according to the current values and the resolution values;
   describing a first parabola passing through the three coordinate points in the coordinate system;
   acquiring a current value of a first highest point of the first parabola;
   inputting the current value of the first highest point to the motor, driving the focusing lens to a position and capturing an image at that position;
   analyzing the image at the position corresponding to the first highest point and acquiring a resolution value of this image;
   defining a fourth coordinate point in the coordinate system according to the current value of the first highest point and the resolution value of the image at the position corresponding to the first highest point;
   describing a second parabola passing through the fourth coordinate point and two coordinate points selected from the first coordinate point, the second coordinate point, and the third coordinate point in the coordinate system, wherein the resolution values of two selected coordinate points are greater than that of unselected coordinate point;
   acquiring a current value of the second highest point of the second parabola;
   comparing a first difference between the current value of the second highest point and the current value of the first highest point with a preset value; and
   regarding the second highest point as the focus point upon a condition that the first difference is less than the preset value.

2. The auto-focus method of claim 1, wherein when the first difference is less than the preset value, the current value of the second highest point is input to the motor, and the focus lens is driven to the focus point.

3. The auto-focus method of claim 1, wherein when the first difference is greater than the preset value, a fifth coordinate point is defined in the coordinate system as the fourth coordinate point; a third parabola is described passing through the fifth coordinate point, the fourth coordinate point, and one coordinate point selected from the first coordinate point, the second coordinate point, and the third coordinate point, wherein the resolution value of the selected coordinate point is greater than that of two unselected coordinate points; a third highest point of the third parabola is obtained; a second difference between the current value of the third highest point and the current value of the second highest point is compared with the preset value; the third highest point is regarded as the focus point upon a condition that the second difference is less than the preset value.

4. The auto-focus method of claim 1, wherein the resolution value of each image is calculated by the following formulas:

$$MTF=(H-L)/(H+L);$$

$$H=\text{Ave}+0.6(\text{Max}-\text{Ave});$$

$$L=\text{Ave}-0.6(\text{Ave}-\text{Min});$$

wherein Ave is an average value of gray values of all pixels of each image, Max is a maximum value of gray values of all pixels of each image, and Min is a minimum value of gray values of all pixels of each image.

5. The auto-focus method of claim 1, wherein the working electric current range is from about 0 A to about 2 A.

6. The auto-focus method of claim 1, wherein the preset value is about 0.005.

* * * * *